(12) United States Patent
Schaffer

(10) Patent No.: US 7,277,057 B2
(45) Date of Patent: Oct. 2, 2007

(54) PROVIDING INTEGRATED CHASSIS ANTENNA FOR PROCESSOR-BASED DEVICES

(75) Inventor: Michael J. Schaffer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1379 days.

(21) Appl. No.: 10/046,596

(22) Filed: Oct. 23, 2001

(65) Prior Publication Data

US 2003/0076266 A1    Apr. 24, 2003

(51) Int. Cl.
*H01Q 1/24* (2006.01)
*H01Q 3/02* (2006.01)

(52) U.S. Cl. .............. 343/702; 343/700 MS; 343/702; 343/725; 343/749

(58) Field of Classification Search ........... 343/702, 343/700 MS, 846, 829, 725, 893, 749, 826, 343/828, 793, 795, 906
See application file for complete search history.

(56) References Cited

U.S. PATENT DOCUMENTS

| | | | | |
|---|---|---|---|---|
| 5,646,635 A | * | 7/1997 | Cockson et al. | 343/702 |
| 5,828,339 A | * | 10/1998 | Patel | 343/700 MS |
| 5,828,341 A | * | 10/1998 | Delamater | 343/702 |
| 6,337,666 B1 | * | 1/2002 | Bishop | 455/575 |
| 6,342,860 B1 | * | 1/2002 | Haussler et al. | 343/702 |
| 6,400,321 B1 | * | 6/2002 | Fenwick et al. | 343/700 MS |
| 6,433,747 B1 | * | 8/2002 | Cumro et al. | 343/700 MS |
| 6,448,932 B1 | * | 9/2002 | Stoiljkovic et al. | 343/700 MS |
| 6,456,242 B1 | * | 9/2002 | Crawford | 343/700 MS |
| 2002/0101378 A1 | * | 8/2002 | Quinn et al. | 343/702 |

* cited by examiner

*Primary Examiner*—Douglas W. Owens
*Assistant Examiner*—Chuc Tran
(74) *Attorney, Agent, or Firm*—Trop, Pruner & Hu, P.C.

(57) ABSTRACT

In one embodiment of the present invention, the antenna is punched out and formed from a front surface of a chassis. The antenna may be connected to a wireless device by a coaxial cable. The center conductor of the coaxial cable may be coupled to the feed point of the antenna and the shield of the coaxial cable may be terminated at the front edge of the chassis to reduce radio frequency radiation from the coaxial shield.

23 Claims, 9 Drawing Sheets

PROVIDING INTEGRATED CHASSIS ANTENNA FOR PROCESSOR-BASED DEVICES

BACKGROUND

The present invention relates to the field of wireless computer networking.

Currently, one of the newest trends in the personal computer (PC) industry involves wireless networking. Specifically, the ability to inexpensively and reliably interconnect multiple computers, peripherals, and like devices within an office or home, without having to install an Ethernet or twisted pair backbone wiring is a strongly desired goal for office and home networking device Original Equipment Manufacture ("OEM"). To achieve this goal, a variety of wireless networking solutions have been designed. These wireless computer networks typically use the radio frequency (RF) bands at 900 MHz and 2.4 GHz that were provided for this type of application.

Typical solutions for desktop computers are comprised of a Personal Computer ("PC") card that plugs into a computer and an antenna that connects to the PC card. The antenna is then mounted onto the outside of the computer case or other convenient external object. For example, the antenna may incorporate a magnetic mount that holds the antenna onto the top of the computer chassis. Alternatively, an antenna may be attached to the computer chassis with an adhesive tape.

However, these systems suffer from at least two deficiencies. First, they are expensive to make. Having to make a separate PC card for the network increases the unit cost relative to a computer with all the circuits on the main board. Given the heavy cost constraints, all PC OEMs have, a single main board solution is highly preferable. The second deficiency relates to the antenna. An external antenna is expensive to supply to the end user. These antennae are typically manufactured by companies specializing in such devices and must be purchased by the computer OEM and packaged with the computer. This increases the logistical issues and costs for the OEM.

While putting the wireless networking components on the main board reduces the unit cost, it creates the problem of connecting an antenna to those network components. Also, as the chassis provides a shielding function "Faraday Cage" to supress electromagnetic interference ("EMI"), any cable passing through it will provide an unwanted outlet for radiation that can cause EMI. Even if the cable is shielded, such as a coaxial antenna cable, and connected to electrical ground at the main board, the impedance of the shield is such that it can still act as an effective radiator for signals generated inside the computer. Such radiation may violate the strict radiation limits imposed by the FCC on PC OEMs and prevent the computer from being sold.

There exists therefore a need for a cost effective antenna system that connects to a wireless network device internal to a computer.

DETAILED DESCRIPTION

Figure 1:
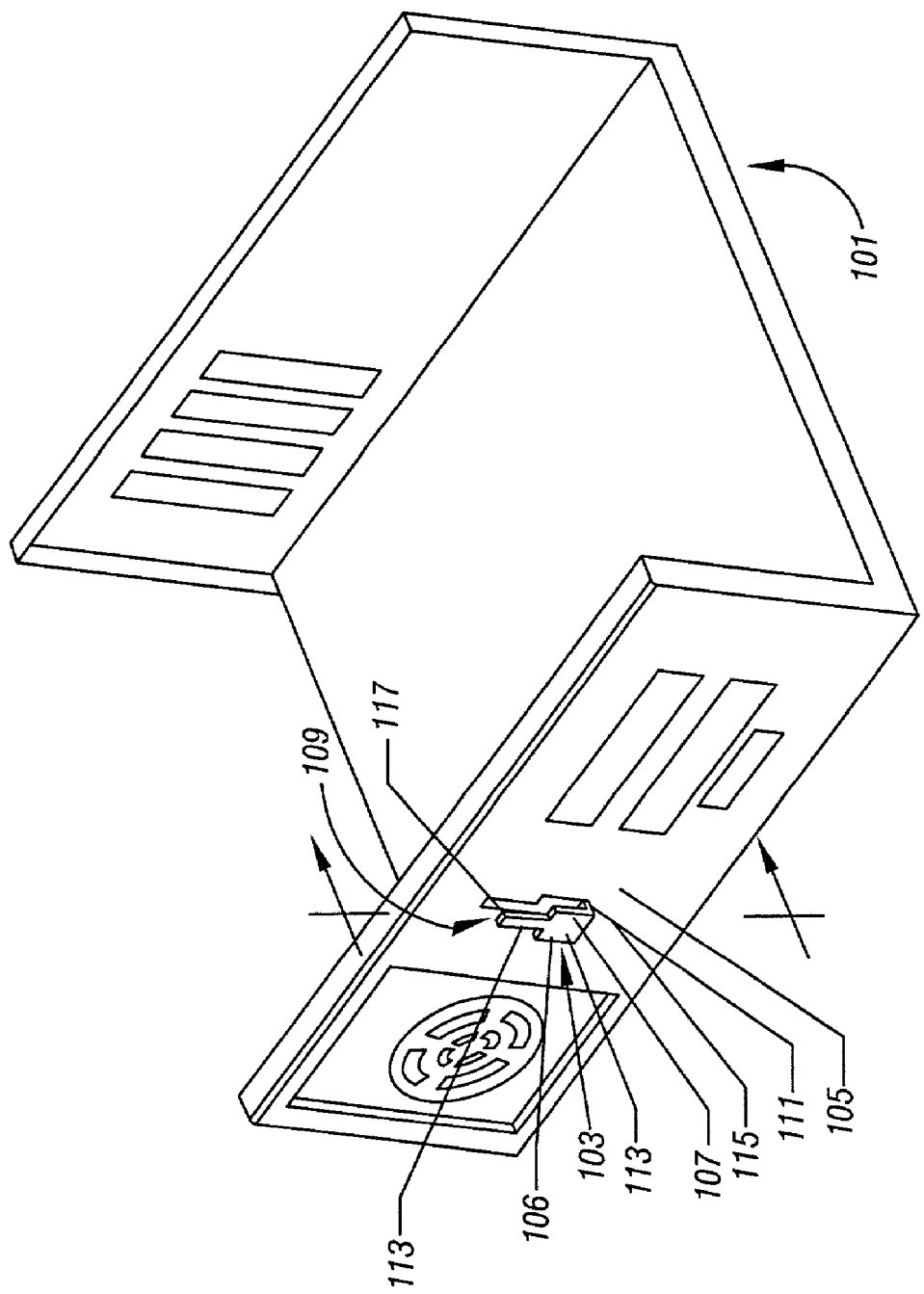
FIG. 1 is a side elevational view of one embodiment of the present invention.

In one embodiment, the antenna 103, shown in FIG. 1, is integrated into the chassis by being formed out of the surface 105 of the chassis 101. The left 106, right 107, and top 109 of the antenna 103 may be released from the surface 105 while a bottom edge 111 may remain attached to the surface 105. The antenna 103 may be bent away from the surface 105 of the chassis 101 along the bottom edge 111. The vertical section 113 may then be bent upward from the base section 115 with one possible configuration being a vertical section 113 generally coplanar with the surface 105 of the chassis 101.

The resultant spacing of the vertical section 113 from the surface 105 may be sufficient to provide radio frequency isolation of the vertical section 113 and the chassis 101 at approximately the desired frequency band of operation of the antenna 103. In operation, a coaxial cable 211 (shown in FIG. 2) may be connected between the feed point 117 of the antenna 103 and a wireless device such as a modem that may be contained within the computer chassis 101. Of course in other embodiments, the antenna design may be modified such that the antenna 103 is rotated from a vertical orientation. For example, the antenna 103 may be rotated such that the vertical section 113 is at an angle that may be 45 degrees, to the base of the chassis. However, it is generally advantageous to have all antenna polarizations similar in a wireless network.

Figure 2:
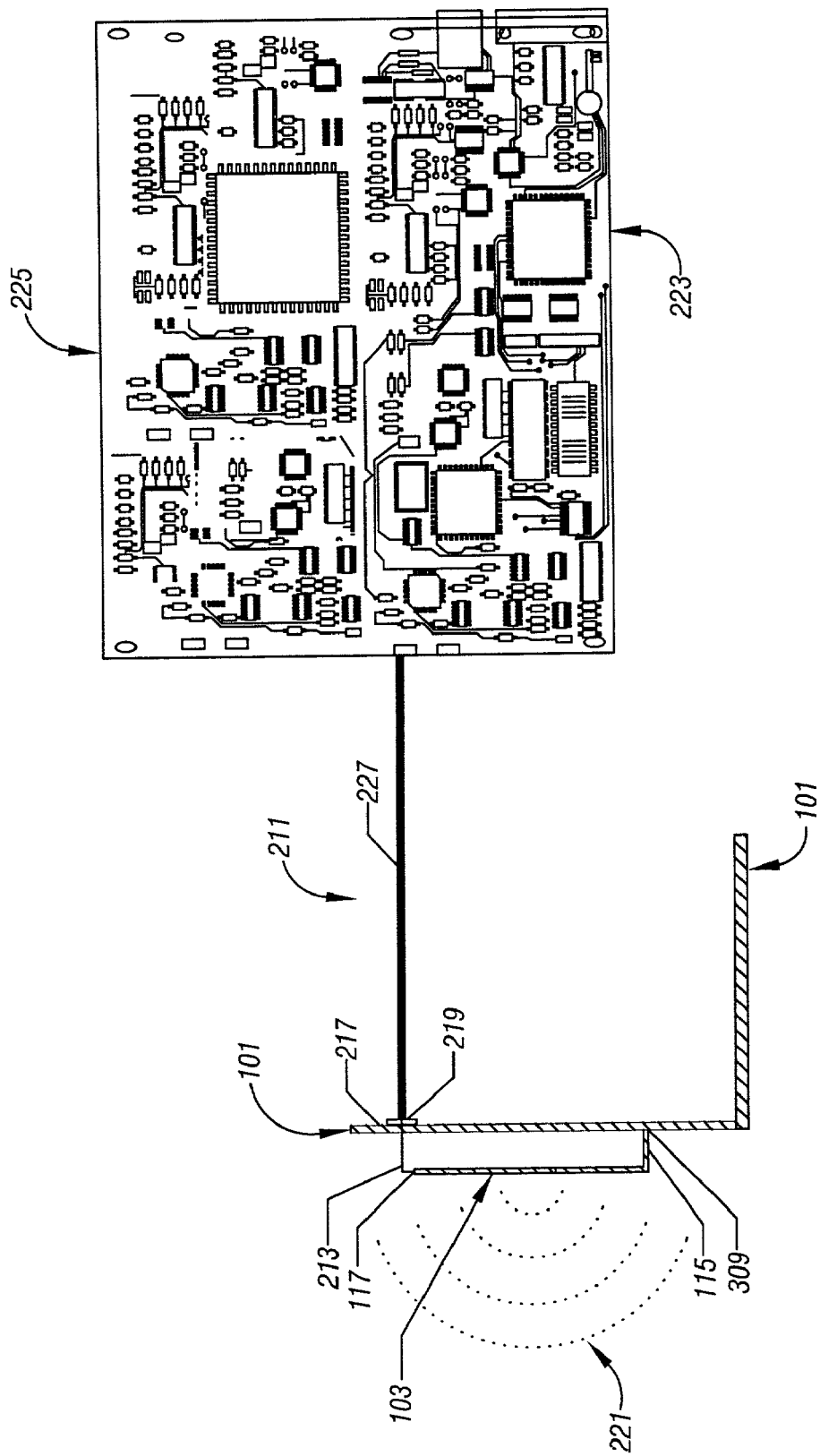
FIG. 2 is a sectional view of an integrated antenna according to one embodiment of the present invention.

Referring to FIG. 2, in one embodiment, the antenna 103 may be coupled by a coaxial cable 211 to a wireless device 223, as one example, a wireless modem that may be located on a main board 225. In one example, the antenna 103 may be coupled to the wireless device by directly soldering the coaxial cable 211 conductors 213 and 227 to the wireless device 223. In another example, a circuit connector may be utilized to connect the coaxial cable to the wireless device 223. The center conductor 213 of the coaxial cable 211 is coupled to the feed point 117 of the antenna 103.

In one embodiment, the coaxial cable 211 shield conductor 227 may be coupled to a front edge 217 of the chassis 101 by a mechanical fastener 219. The mechanical fastener 219 may be any suitable device such as a screw or clip, as two examples, that may provide a sufficiently low impedance contact between the shield and the chassis front edge 217. Using a low impedance contact between the chassis 101 and coaxial shield 227 as the coaxial cable 211 exits the chassis 101 may reduce the unintended radiation of signals internal to the chassis 101 by the coaxial shield 227. Therefore the shielding effect of the chassis 101 may be retained.

In some embodiments, the antenna 103 may be designed such that it is useful over approximately the particular frequencies utilized by the wireless device 223. Typical wireless computer networks may use either the radio frequency (RF) bands at 900 MHz or 2.4 GHz. Therefore the antenna 103 may be designed to be approximately resonant over at least one of those frequency bands in some embodiments. General information on antenna theory and wave propagation can be obtained from the book "Antenna Theory, Analysis and Design," by Constantine A. Balanis, published by John Wiley & Sons.

In some embodiments, the wireless device 223 may provide the antenna 103 with an appropriate Radio Frequency ("RF") signal through the coaxial cable 211. RF signals from the wireless device 223 may flow through the coaxial cable 211 to the antenna 103 causing the antenna to radiate RF energy 221. Other wireless devices that may be part of a wireless network may receive this RF energy 221.

Figure 3A:
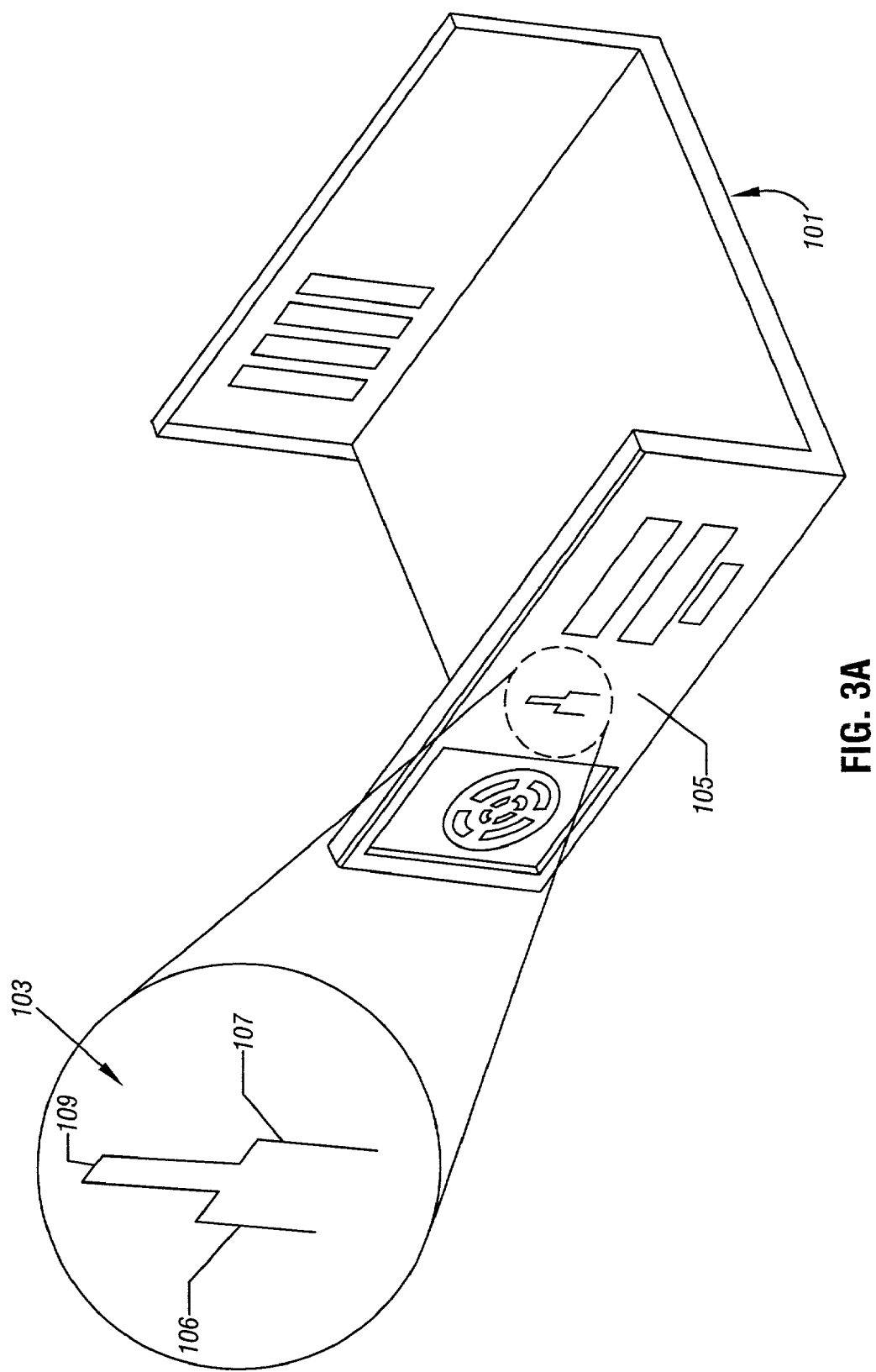
FIGS. 3a-3c are side elevational views of one embodiment of the present invention.
Figure 3B:
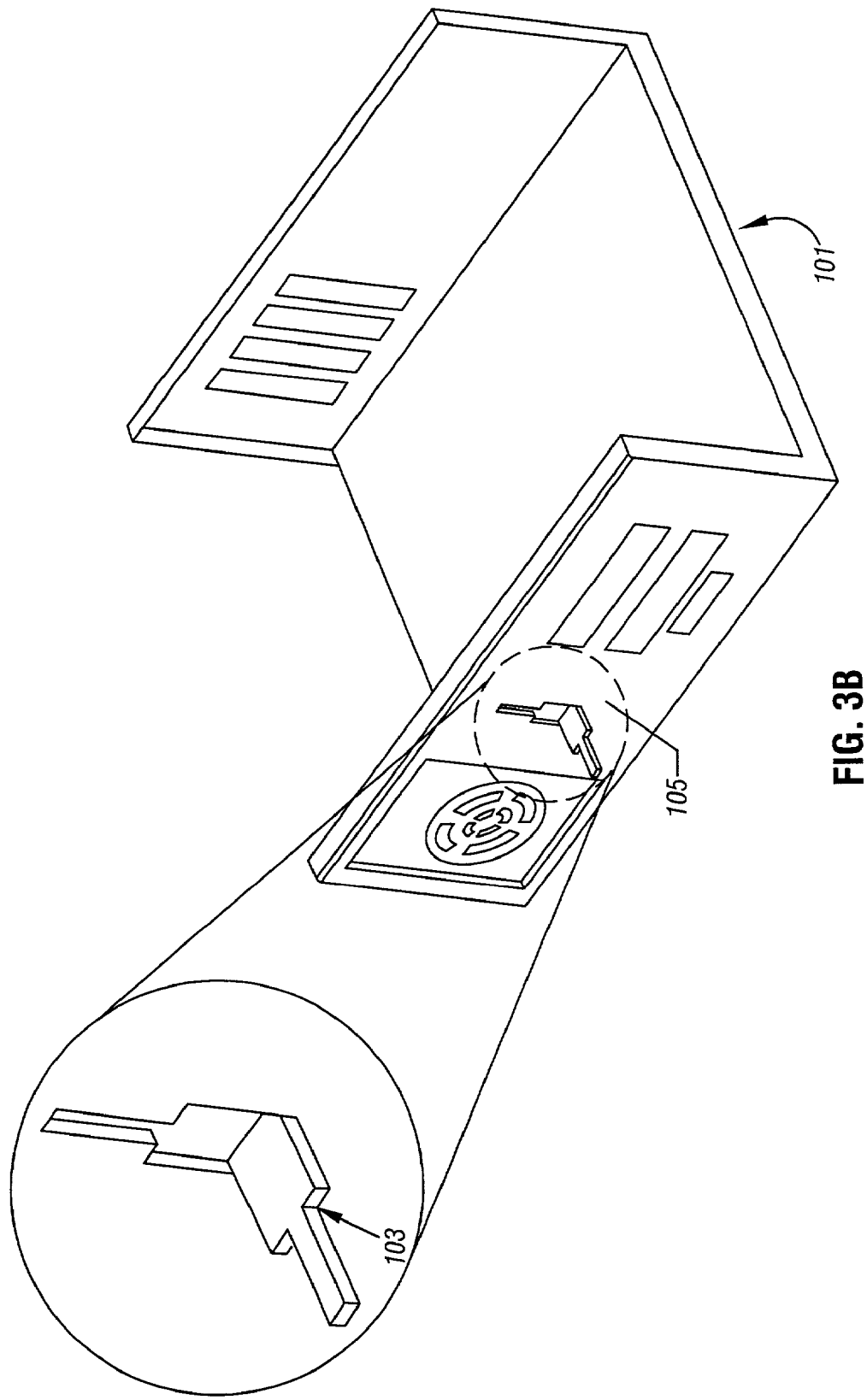
Figure 3C:
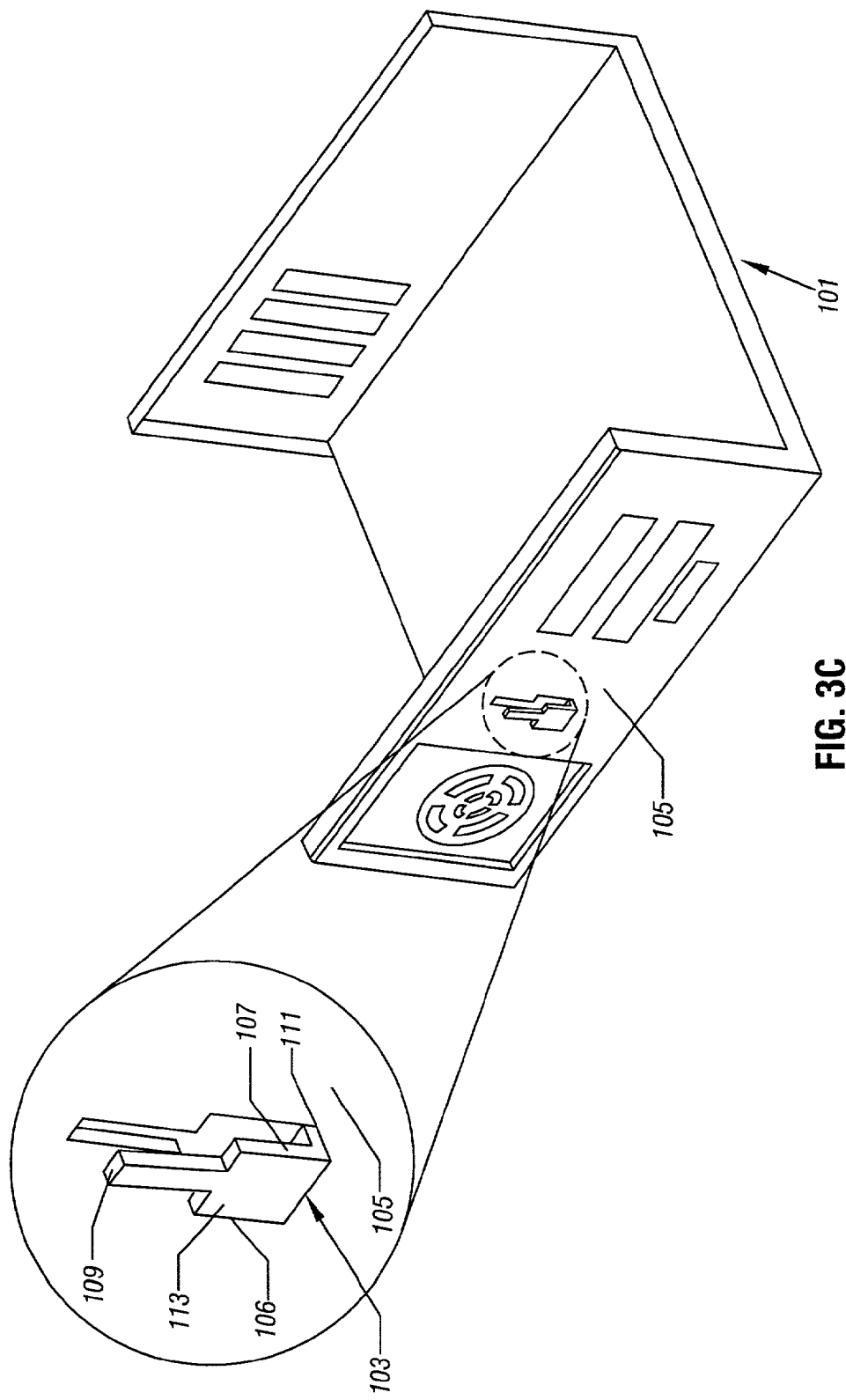

FIG. 3A-3C illustrate one example of manufacturing the antenna 103. In FIG. 3A, the left 106, right 107 and top 109 of the antenna 103 may be released from the surface 105 of the chassis 101. This may be referred to as a "blanking" process where the antenna pattern is blanked out of the chassis into a "blank form". In FIG. 3B, the antenna 103 may be bent away from the surface 105. In FIG. 3C, the vertical section 113 of the antenna 103 may be bent generally coplanar with the surface 105 which may leave the bottom edge 111 attached to the surface 105. In some embodiments, the antenna 103 may be released and formed by a punch and die. In other embodiments, progressive dies may perform the forming. In still other embodiments, the antenna 103 may be formed by cutting and bending.

Figure 4A:
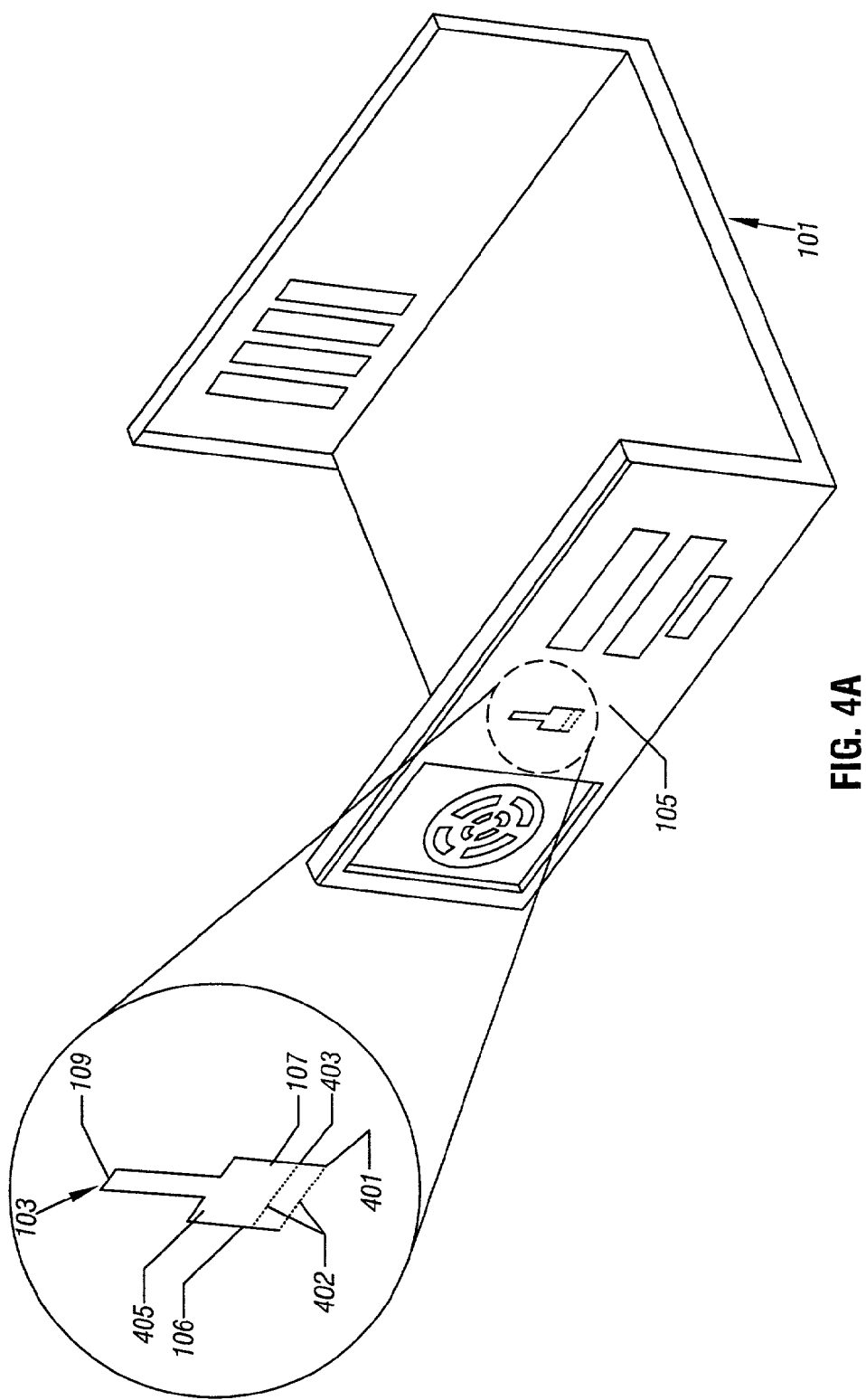
FIGS. 4a-4b are side elevational views of two embodiments of the integrated antenna.

FIG. 4A illustrates another method of manufacturing the antenna 103. In this example, perforations 402 may be formed along bend lines 401 and 403. The blank form 405 may then be bent to form the antenna 103.

Figure 4B:
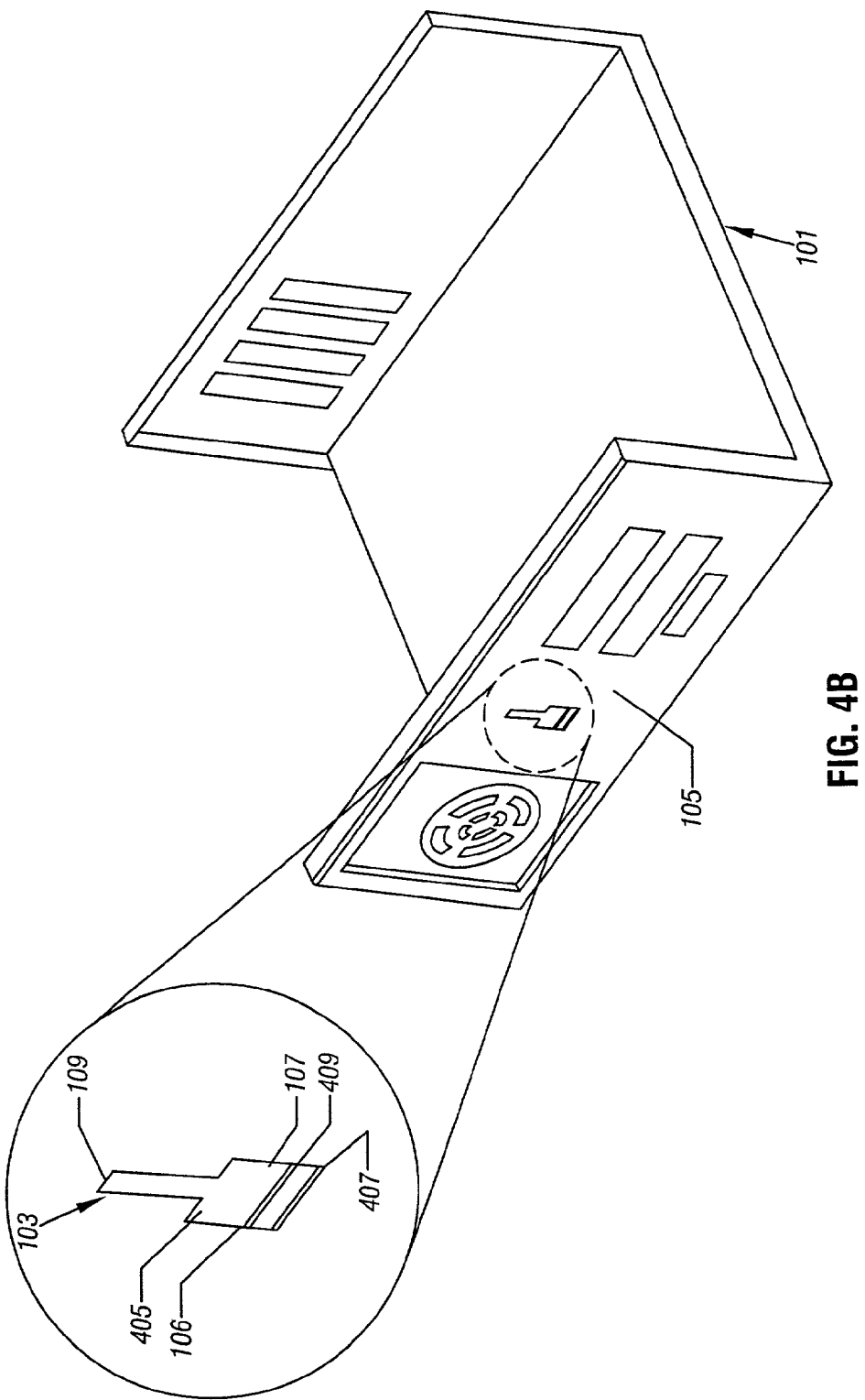

In another embodiment illustrated in FIG. 4B, the metal blank 405 may have score lines 407 and 409 that may serve to form bend lines. The blank form 405 may then be bent to form the antenna 103.

The preceding methods of manufacture are illustrative of a few of the many methods that may be utilized to manufacture the antenna 103.

Figure 5:
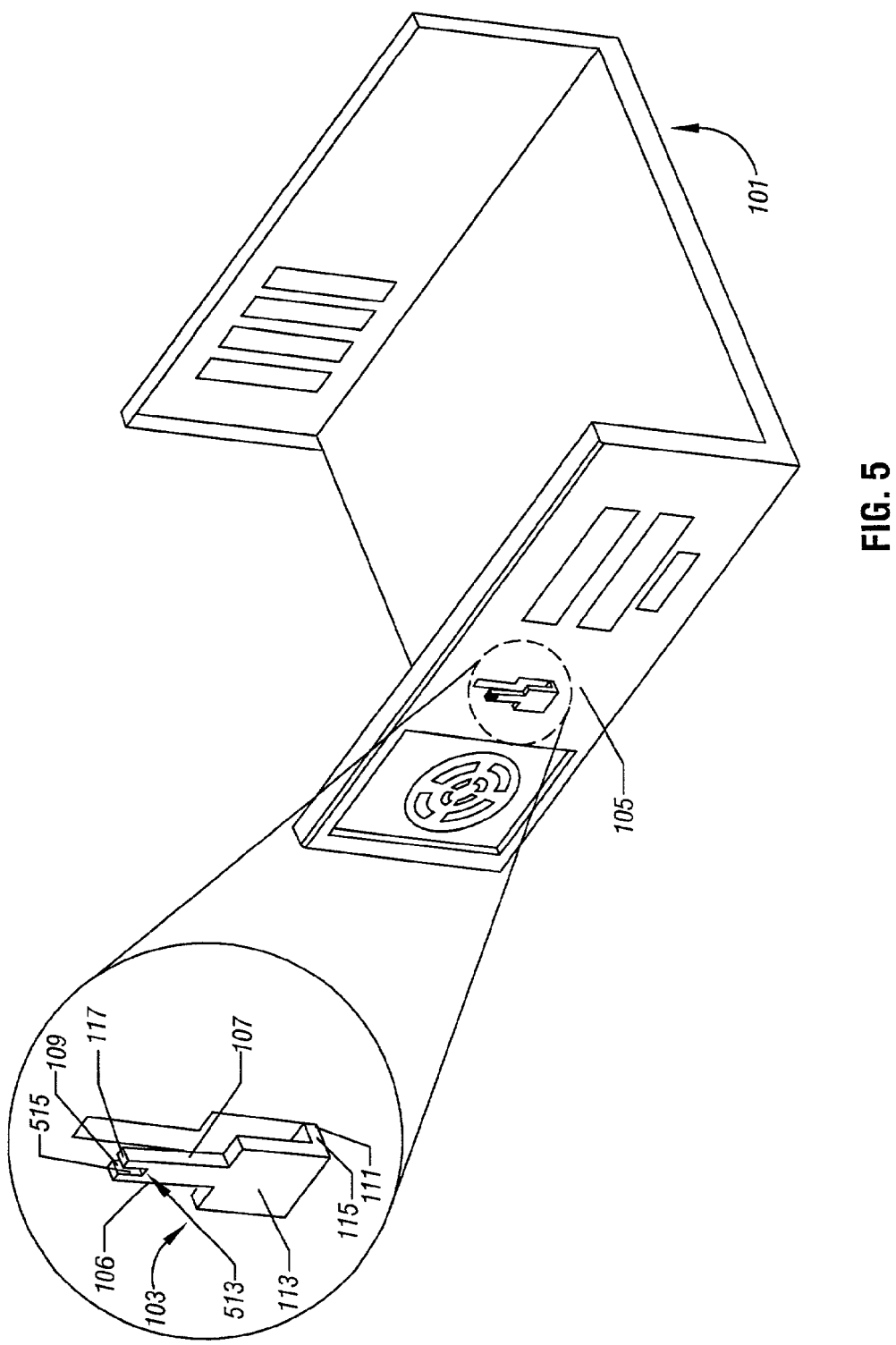
FIG. 5 is a side elevational view of an integrated antenna incorporating a center conductor retention feature according to another embodiment of the present invention.

FIG. 5 illustrates an additional embodiment where the antenna 103 may be formed with a coaxial cable center conductor retention feature 513. This retention feature 513 may be formed by making a slot 515 at the antenna 103 feed point 117. In operation, a coaxial cable 211 (shown in FIG. 2) may connect the feed point 117 of the antenna 103 to a wireless device 223 that may be mounted within the computer chassis 101. The slot 515 may hold the center conductor 213 of the coaxial cable. In some embodiments, the center conductor may then be soldered to the antenna feed point 517 if desired.

Figure 6:
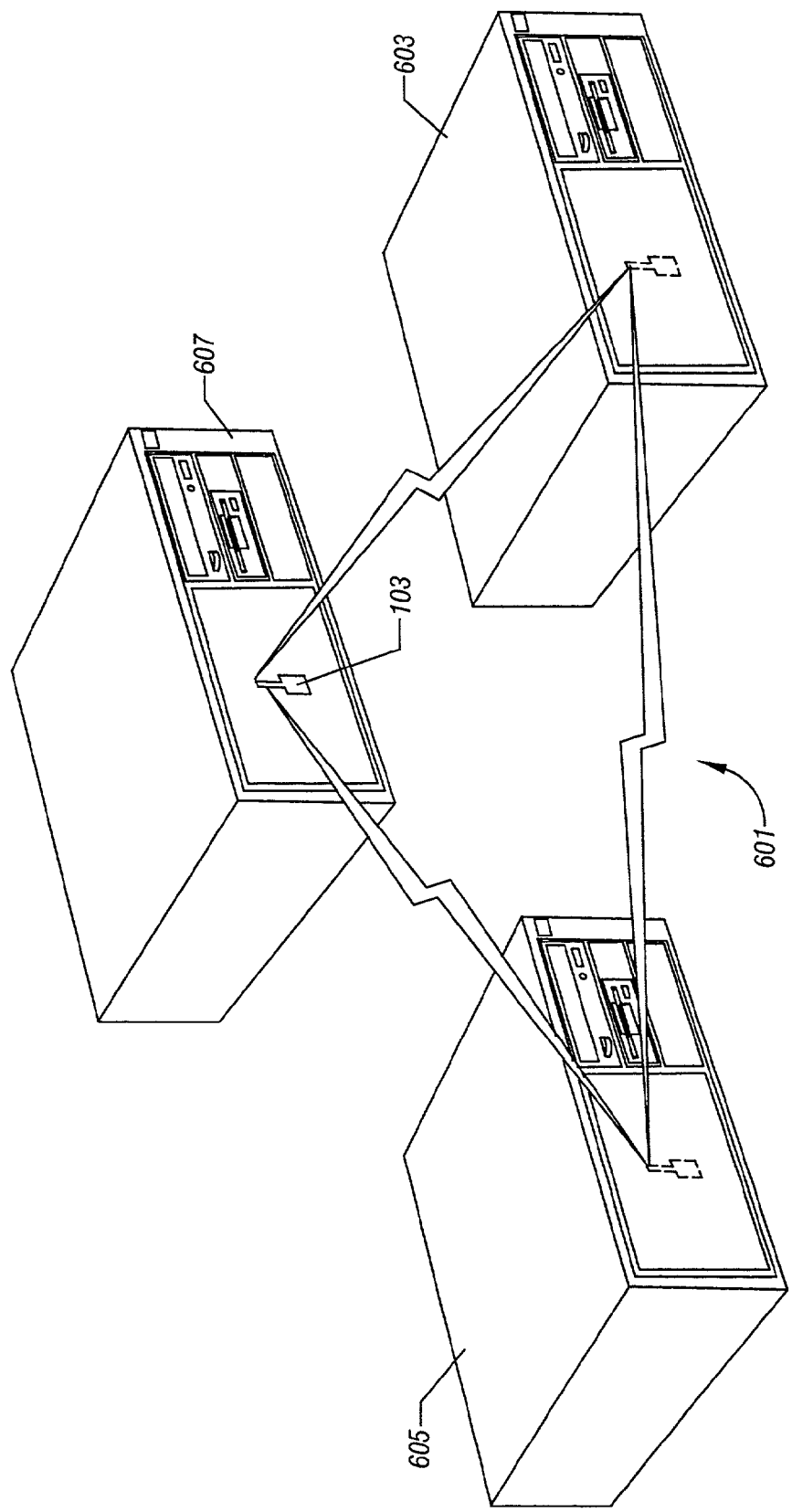
FIG. 6 is a perspective view of a wireless computer network incorporating a computer utilizing an integrated antenna according to one embodiment of the present invention.

FIG. 6 illustrates one of many possible embodiments of a wireless networking system 601. This system may include a plurality of computers 603, 605 and 607. In some embodiments, at least one of the computers 607 incorporates an integrated antenna 103. The antenna 103 enables a wireless device (shown in FIG. 2) internal to the computer 607 to communicate with other devices that may be part of the network system 601. While this system 601 illustrates a network of computers, other wirelessly networked devices such as printers, network monitors, hubs, switches and the like may send data to, or receive data from the computer 607.

In many of the above described embodiments, a direct coupling may be made to the antenna feed point by a center conductor of a coaxial cable. However, many other method of feeding RF energy to the antenna may also be used. As an additional example, a shunt feed system may be utilized that may not use a direct coupling between the antenna feed point and the center conductor of the coaxial cable.

As used herein, "integrated" or "integrating" means to form or forming from material that forms a chassis and remaining contiguous, in part, with the chassis. Also, the above illustrated embodiments are just some of the many possible embodiments of the invention. For example, in other embodiments, the invention may be utilized for wireless network hubs or switches. In yet other embodiments, the invention may be utilized for wireless phones.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A wireless computer network comprising:
   a wireless network computer having a chassis;
   an integrated chassis antenna that is coupled to the computer chassis;
   a first wireless network device coupled to the integrated chassis antenna; and
   a second wireless network device operative to communicate with the wireless network computer.

2. The wireless computer network as in claim 1 wherein the chassis includes a front surface and the first wireless network device is coupled to the integrated chassis antenna by a coaxial cable and a shield conductor of the coaxial cable is coupled to the front surface of the computer chassis.

3. The wireless computer network as in claim 2 wherein the integrated chassis antenna is formed with a base section and a vertical section, and the base section spaces the vertical section away from the computer chassis.

4. An apparatus comprising:
   a chassis;
   an antenna having a feed point; and
   the antenna integrated into the chassis.

5. The apparatus as in claim 4 wherein:
   the antenna has at least one edge and that edge remains in common with the chassis.

6. The apparatus as in claim 4 wherein:
   the chassis includes a front edge; and
   a coax cable shield conductor is coupled to the chassis at the front edge of the chassis.

7. The apparatus as in of claim 4 wherein:
   the antenna includes a center conductor retention feature.

8. The apparatus as in claim 4 wherein:
   the antenna remains in blank form.

9. An apparatus comprising:
   a chassis and a wireless device;
   an antenna integrated into the chassis and the antenna having a feed point; and
   the wireless device coupled to the feed point of the antenna.

10. The apparatus as in claim 9 wherein:
    the antenna has at least one edge and that edge remains in common with the chassis.

11. The apparatus as in claim 9 wherein:
    the chassis includes a front edge and a coax cable shield conductor is coupled to the chassis at the front edge.

12. An apparatus as in claim 9 wherein:
    the antenna includes a center conductor retention feature.

13. The apparatus as in claim 9 wherein the antenna includes a vertical section spaced away from the chassis.

14. A method comprising:
    fabricating a chassis; and
    integrating an antenna with the chassis, including forming the antenna from a part of the chassis and forming the antenna with an edge contiguous with the chassis.

15. The method of claim 14 wherein integrating the antenna includes forming a feed point with a center conductor retention feature.

16. The method of claim 14 wherein integrating the antenna includes forming the antenna with a base section and a vertical section, and forming the base section to space the vertical section away from the chassis.

17. The method of claim 14 wherein integrating the antenna includes perforating the contiguous edge forming a bend line.

18. The method of claim 17 wherein integrating the antenna includes perforating the antenna forming a second bend line.

19. The method of claim 14 wherein integrating the antenna includes forming a bend line by scoring the contiguous edge.

20. The method of claim 19 wherein integrating the antenna includes forming a second bend line by scoring the antenna.

21. The method of claim 14 wherein integrating the antenna includes blanking an antenna pattern from the chassis.

22. The method of claim 21 wherein integrating the antenna includes perforating the antenna forming a bend line.

23. The method of claim 21 wherein integrating the antenna includes scoring the antenna forming a bend line.

* * * * *